Feb. 3, 1931. H. L. MORAN 1,790,875
METHOD FOR THE TREATMENT OF RUBBER STOCK
Filed Dec. 16, 1927
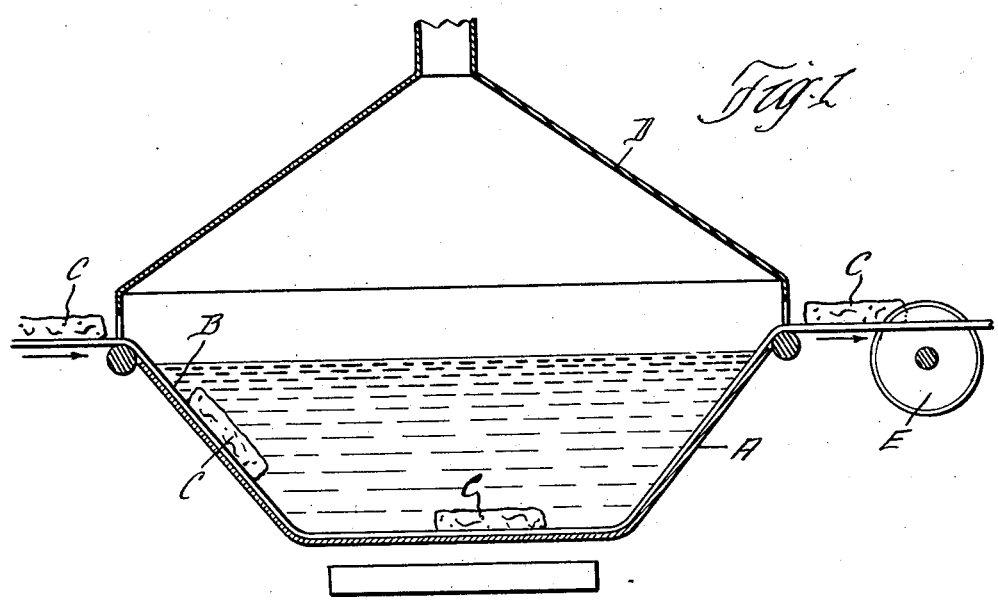
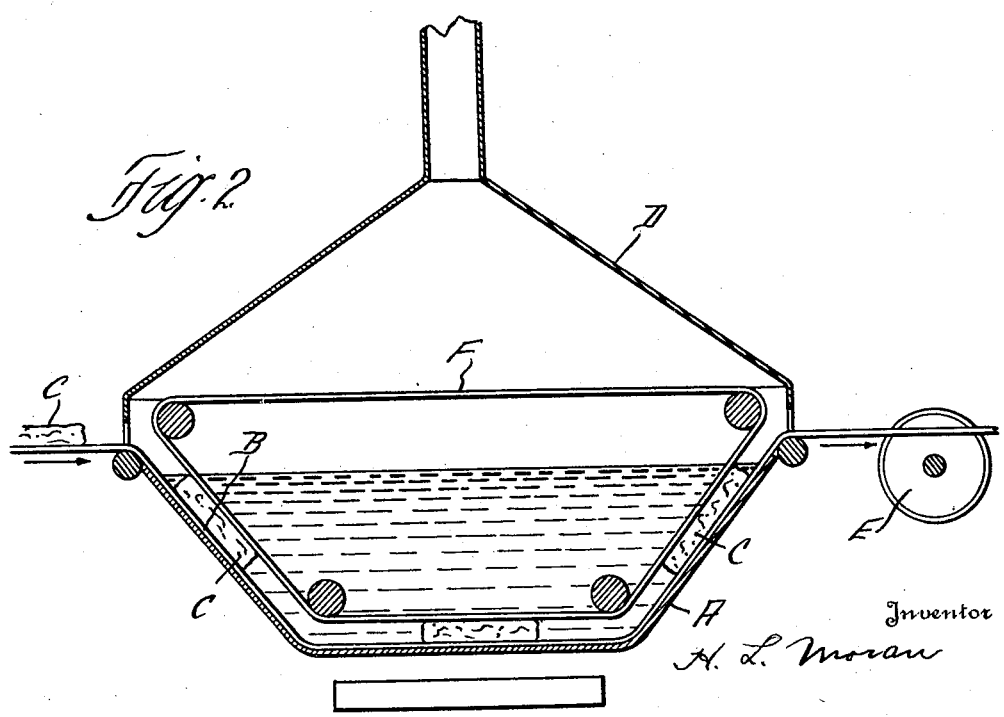
Inventor
H. L. Moran
By Hull Brock & West
Attorney Patented Feb. 3, 1931

1,790,875

UNITED STATES PATENT OFFICE

HENRY L. MORAN, OF CLEVELAND, OHIO

METHOD FOR THE TREATMENT OF RUBBER STOCK

Application filed December 16, 1927. Serial No. 240,388.

This invention relates to a novel method and apparatus for treatment of rubber.

Heretofore, so far as I am aware, it has been standard practice to treat rubber stock to what is known as the "breaking process" preparatory to feeding the same to a calendering machine or a tubing machine.

"Rubber stock," it will be understood is the term used to designate a compound of pure rubber or reclaimed rubber and various ingredients which enter into the different rubber compounds according to the nature of the article to be formed.

In articles requiring the greatest amount of rubber there may be as much as 96% pure rubber and 4% compound, whereas, for other articles of manufacture, there can be as little as 10% of pure rubber or reclaimed rubber and 90% of compound consisting of sulphur and various types of fillers.

The raw rubber or pure rubber or reclaimed rubber is first treated and combined with the proper quantity of compounds in order to produce the article desired and after being so compounded is produced in suitable dimensions for storage in stock rooms. It is this "stock," taken from the store room which is treated for the purpose of softening the same in order that it may be fed to a calendering or tubing machine or other types of rubber working machinery.

The machine usually employed is what is known as a "breaking" or frictioning machine consisting of two heavy rollers, preferably traveling at different speeds, and the pieces of "rubber stock" are fed in between these rollers and carried around a number of times thereby subjecting them to what is known as the "breaking" operation, and due to this operation heating up the rubber to the proper degree without effecting what is known as the cure or vulcanization of the rubber, as it is well known that when rubber is subjected to a curing or vulcanizing temperature that it cannot be returned to its former state after the same has become cool after the cure or vulcanization has been effected. These breaking machines are large machines requiring a great deal of power for their operation and consequently are quite expensive both for their original cost and for their operation and maintenance.

Furthermore, it is not only possible but it frequently happens that the "rubber stock" after having been treated in the breaking machine is not of uniform character throughout. The breaking machine is also inefficient at times due to the manner in which labor can be coordinated in the factory employing such machines.

The object of my invention, therefore, is to provide an exceedingly simple and inexpensive method and apparatus for treating the "rubber stock" and which will take the place of the breaking machine now in common use.

Broadly speaking, my invention involves subjecting the "rubber stock" to the proper degree of heat for a definite length of time for the purpose of softening the same so that it is ready for delivery to the machines required for the next operations.

The invention also involves providing a suitable tank or receptacle through which the rubber stock can be passed at the proper speed, and in which it can be subjected to the action of water or steam or both, in order to subject the same to the proper degree of softening temperature.

The invention consists also in certain details hereinafter fully described and set forth in the appended claims.

While various forms of apparatus may be devised for carrying out my method and invention, I have shown one form of device and in which Fig. 1 is a longitudinal sectional view and Fig. 2 is a similar view showing a slight modification.

Referring to the drawings A indicates a tank or receptacle in which water may be placed and beneath this receptacle is arranged any suitable type of heating apparatus. This heating apparatus, in case the same is of the electrical nature, can be attached to or built into the tank if so desired, this tank being preferably made of metal.

Passing through the tank A is a conveyor B by means of which the "rubber stock" C can be fed to the tank and carried therethrough.

D indicates a cover placed over the top of the tank or receptacle for the purpose of carrying off the fumes or vapors and also for the purpose of permitting the proper temperature to be more readily attained and held.

In practice I prefer to heat the water within the receptacle to about 210° or 211° F. but it will of course be understood that this temperature may be slightly higher or lower as the necessities of the particular stock may require, the all important point being that the rubber stock should not be subjected to such a high degree of heat as will effect a cure or vulcanization thereof.

It is well known that rubber is of a globular nature and it is the transformation or changing of these globules that renders the stock hard or soft, as the case may be, and by the practice of my improved method, I have found that the proper transformation of these globules can be effected in a short space of time by passing the same through the water at the proper temperature.

If desired, cutting knives E may be arranged at the delivery end of the tank for the purpose of cutting the softened stock into strips for the purpose of feeding the same to the tubing machine, but where the softened stock is to be fed to a calendering machine, these cutting knives may be omitted.

If desired, an endless reticulated belt F can be arranged within the tank or receptacle for the purpose of guiding the stock as it passes through the receptacle or tank upon the conveyor B, this endless belt merely serving to hold the stock and conveyor in their proper positions and guiding the same through the tank or receptacle.

By means of the simple apparatus herein shown and described, and by practicing the method as herein set forth, I am able to accomplish in the way of softening the rubber stock all that can be accomplished by the breaking rollers, and furthermore, this transformation can be accomplished in a remarkably short time and the entire apparatus involving an expenditure so small in comparison with the cost of the breaking rollers as to be negligible.

Furthermore, the transformed stock is delivered in a uniform condition due to the fact that all of the stock has been subjected to a uniform degree of heat for a definite length of time.

While I have described the tank or receptacle as containing water, it will be understood that water can be omitted and steam injected into the tank or receptacle for the purpose of accomplishing the heating operation, it being understood of course that the temperature within the receptacle is regulated at all times and maintained at the proper degree of temperature according to the nature of the stock being treated.

Having thus described my invention, what I claim is:

1. The herein described method which consists in passing the rubber stock through a receptacle containing water, which water is heated to approximately the boiling point thereof and whereby the rubber stock is softened without the cure or vulcanization thereof being effected.

2. The herein described method which consists in passing the rubber stock through a receptacle containing fluid, which fluid is heated to a temperature approximating the boiling point of water and substantially below the vulcanizing temperature of such stock whereby the said stock is softened without the cure or vulcanization thereof being effected.

3. The herein described method which consists in passing the rubber stock through a receptacle containing a liquid whose boiling point is below the vulcanizing temperature of said stock while maintaining the temperature of said liquid at approximately the boiling point thereof and whereby the rubber stock is softened without the cure or vulcanization thereof being effected.

In testimony whereof, I hereunto affix my signature.

HENRY L. MORAN.